United States Patent
Fantazi

(10) Patent No.: US 7,905,002 B2
(45) Date of Patent: Mar. 15, 2011

(54) METHOD OF MANUFACTURING A STEEL HOUSING

(75) Inventor: Alain Fantazi, Dives sur mer (FR)

(73) Assignee: KNORR-BREMSE Systeme fuer Nuuzfahrzeuge GmbH, Munich (DE)

( * ) Notice: Subject to any disclaimer, the term of this patent is extended or adjusted under 35 U.S.C. 154(b) by 790 days.

(21) Appl. No.: 11/812,375

(22) Filed: Jun. 18, 2007

(65) Prior Publication Data

US 2008/0034570 A1 Feb. 14, 2008

Related U.S. Application Data

(63) Continuation of application No. PCT/EP2005/013606, filed on Dec. 16, 2005.

(30) Foreign Application Priority Data

Dec. 17, 2004 (DE) .......................... 10 2004 060 862
Nov. 10, 2005 (DE) .......................... 10 2005 053 674

(51) Int. Cl.
*B23P 11/00* (2006.01)
*B23P 25/00* (2006.01)

(52) U.S. Cl. ................. 29/458; 29/463; 29/505; 29/509; 403/282; 403/285

(58) Field of Classification Search ................. 29/897.2, 29/458, 505, 509, 463; 188/322.19; 403/282, 403/285
See application file for complete search history.

(56) References Cited

U.S. PATENT DOCUMENTS

| 1,619,549 A | 3/1927 | Stringer |
| 5,393,611 A * | 2/1995 | Flamme .................. 428/450 |
| 5,676,036 A | 10/1997 | Choinski |
| 5,680,703 A * | 10/1997 | Ono et al. ................. 29/890.13 |
| 5,849,382 A | 12/1998 | Schneck |
| 6,739,168 B2 * | 5/2004 | Hario et al. ................. 72/306 |

FOREIGN PATENT DOCUMENTS

| DE | 30 457 | 1/1966 |
| DE | 30 457 A | 1/1966 |
| DE | 32 06 489 A1 | 9/1983 |
| DE | 256 662 A1 | 5/1988 |
| DE | 198 30 154 A1 | 1/1999 |
| DE | 10010758 A1 | 9/2001 |
| DE | 60104583 T2 | 8/2005 |

(Continued)

OTHER PUBLICATIONS

International Search Report dated Mar. 31, 2006 with English translation (Six (6) Pages).

(Continued)

*Primary Examiner* — Jermie E Cozart
(74) *Attorney, Agent, or Firm* — Crowell & Moring LLP

(57) ABSTRACT

A method is provided for producing metal housings composed of at least two housing parts, in particular for units mounted in commercial vehicles. A corrosion prevention layer composed of zinc or a zinc-containing alloy is applied onto an outwardly facing surface of at least one housing part with a subsequent passivation, and a positive overlapping of an edge of one housing part by the edge of another housing part is effected by way of a relative movement of the housing parts being reciprocally aligned beforehand with regard to a die stamp, which plastically deforms the edge of housing part and/or the edge of the other housing part.

17 Claims, 2 Drawing Sheets

FOREIGN PATENT DOCUMENTS

EP  1 136 337 B1  9/2001
EP  1136337 A1  9/2001

OTHER PUBLICATIONS

German Examination Report dated May 5, 2006 with an English translation of the pertinent portions (Nine (9) pages).
Braeunlich, H et al:, "Umformverhalten oberflaechenbeschichteter Stahlbleche" Oct. 1998, pp. 18, 21-23.
Pohl, F.R., "Erst lackieren, dann umformen" 20/1987, pp. 22-37.
F. R. Pohl: Erst lackieren, dann umformen; Industrie-Anzeiger 20/1987, pp. 22-37 (Opposition—no English translation readily available).
Braunlich, H; Demmler, M.: Umformverhalten oberflachengeschichteter Stahl-bleche, in: Bander Bleche Rohre, Oct. 1998, pp. 18-23 (Opposition—no English translation readily available).
Oehler, Kaiser: Stanz, Biege- und Ziehwerkzeuge, 8. Auflage, 2001 (Opposition—no English translation readily available).
Meyers Konversationslexikron, 4. Auflage, 1885-1892, pp. 213-214 (Opposition—no English translation readily available).
Communication from the European Patent Office mailed Apr. 23, 2010.

\* cited by examiner

METHOD OF MANUFACTURING A STEEL HOUSING

CROSS-REFERENCE TO RELATED APPLICATIONS

This application is a continuation of PCT International Application No. PCT/EP2005/013606, filed on Dec. 16, 2005, which claims priority under 35 U.S.C. § 119 to German Application Nos. 10 2004 060 862.8, filed Dec. 17, 2004 and 10 2005 053 674.3, filed Nov. 10, 2005, the entire disclosures of which are expressly incorporated by reference herein.

BACKGROUND AND SUMMARY OF THE INVENTION

The invention is based on a method for manufacturing steel housings, composed of at least two housing components, for assemblies installed in vehicles, in particular in utility vehicles.

In order to activate brakes in utility vehicles, use is made, inter alia, of combined pneumatic service brake cylinders and spring brake cylinders. Such a combination cylinder is, connected in series, a combination of a service brake cylinder for activating the service brake and a spring brake cylinder for activating the auxiliary (parking) and spring brake.

A method is known from EP 1 136 337 B1, which discloses a combined service brake cylinder and spring brake cylinder of a utility vehicle, in which the housing of the service brake cylinder and the housing of the spring brake cylinder are connected to one another by the edge of the spring brake cylinder overlapping the edge of the service brake cylinder in a positively locking fashion, which is also referred to as beading.

Such beading is frequently produced by rolling, i.e. the edge of at least one housing component is shaped plastically by a circulating rolling tool. However, at least the outwardly pointing surface of the housing components must firstly be provided with a corrosion prevention means since assemblies of vehicles, such as, for example, combined service brake cylinders and spring brake cylinders of utility vehicles which are arranged near to the wheel, are subjected to moisture which is permeated by de-icing salt. Corrosion prevention layers which are used in this context are composed, for example, of a sprayed-on epoxy plastic layer or of a simple zinc layer. However, it has become apparent that the corrosion prevention layer can be damaged by the beading fabrication step and therefore the necessary resistance to corrosion is not achieved, the resistance being, for example, that the housing has to withstand over 400 hours of uninterrupted wetting with salt water without corroding.

The invention is based on the object of developing a method for manufacturing housings, composed of at least two housing components, for assemblies installed in vehicles, in particular in utility vehicles, in such a way that it permits beading which shapes the housing components to be fabricated without adversely affecting the corrosion prevention means of such housing components.

This object is achieved according to the invention by application of a corrosion prevention layer comprising zinc or an alloy containing zinc to at least one outwardly pointing surface of at least one housing component with subsequent passivation, and manufacture of a positively locking overlap by the edge of one housing component over the edge of the other housing component by way of relative movement of the housing components which have previously been oriented with respect to one another and in relation to a die which plastically shapes the edge of one housing component and/or the edge of the other housing component.

The invention is based on an advantageous combination of two method steps, specifically on the one hand the fabrication of beading by use of a die and, on the other hand, the coating of the surface with a corrosion prevention layer comprising zinc or an alloy containing zinc, and subsequent passivation. It has become apparent that such a corrosion prevention layer is not damaged if the beading is manufactured with a die.

The protection against corrosion which is provided by the zinc or the other metal alloys is due to the fact that it is even more stainless than the basic metal steel and therefore functions as the sacrificial anode. As long as the covering zinc layer is present, the basic metal is protected against corrosion. Other metals can influence the corrosion protection provided by the zinc layer. Iron, nickel or cobalt are therefore used selectively as alloy components for the purpose of bringing about improvement. The zinc is itself protected against corrosive attack by the passivation, generally by chromatization. The thicker, denser and more chemically resistant the layer of chromate, the better the barrier effect.

As a result of this, a high degree of resistance to corrosion is provided for a housing which is manufactured according to the inventive method, and a high degree of operational reliability is provided, which is essential in particular if the component is a brake cylinder.

Advantageous developments and improvements of the invention are described herein.

The assembly whose housing is fabricated by the method according to the invention is preferably a brake cylinder, in particular a combined service brake and spring brake cylinder, an air dryer or a brake booster of a utility vehicle, therefore assemblies with sheet metal housings which have at least two components and are, for example, deep drawn.

The relative movement between the die and the housing components particularly preferably occurs in an axial direction with respect to a central axis of the assembly. Alternatively, the relative movement can occur in a radial direction with respect to the central axis of the assembly.

The die can be embodied as a single-component or multi-component ring with a radially inner recess which exerts pressure against the edge of the one housing component and/or the edge of the other housing component. In the case of an axial relative movement between the die and the housing halves, the die can be embodied as a single component or multiple components, and in the case of a radial relative movement it can only be in multiple components, for example if the housing components have regions which project radially beyond their end edges and would therefore collide with a single-component ring which is guided in the axial direction and surrounds the housing components.

Before the application of the die, for example one housing component is clamped in through a clamping device and the other housing component is fitted onto the latter in such a way that the edges of the housing components overlap. The reaction forces which arise during the deformation are held then by the housing components themselves or by structures which are located in the interior, and are conducted away via the clamping device. In cases in which this is possible, a die plate which is assigned to the die can be dispensed with, otherwise, if the housing components are not sufficiently rigid, there has to be a fixed die plate which absorbs the reaction forces and can additionally serve to shape the beading by being provided with corresponding recesses itself.

In order to keep the forces occurring during deformation low, before the application of the die, the edge of one housing component can be preshaped to form a shoulder which projects radially outward. This may have already taken place within the scope of a preceding deep drawing process. Particularly good rigidity of the beading connection is obtained if this shoulder has an undercut cross section.

Particularly good protection against corrosion is obtained if the corrosion prevention layer has pure zinc, a zinc/iron alloy, or an alkaline zinc/nickel alloy, and the passivation includes chromatization. In order to meet the EU guideline 2000/53/CE, solutions containing chromium (VI) (chromium in the hexavalent state) should be avoided.

Other objects, advantages and novel features of the present invention will become apparent from the following detailed description of the invention when considered in conjunction with the accompanying drawings.

DETAILED DESCRIPTION OF THE DRAWINGS

Figure 1:
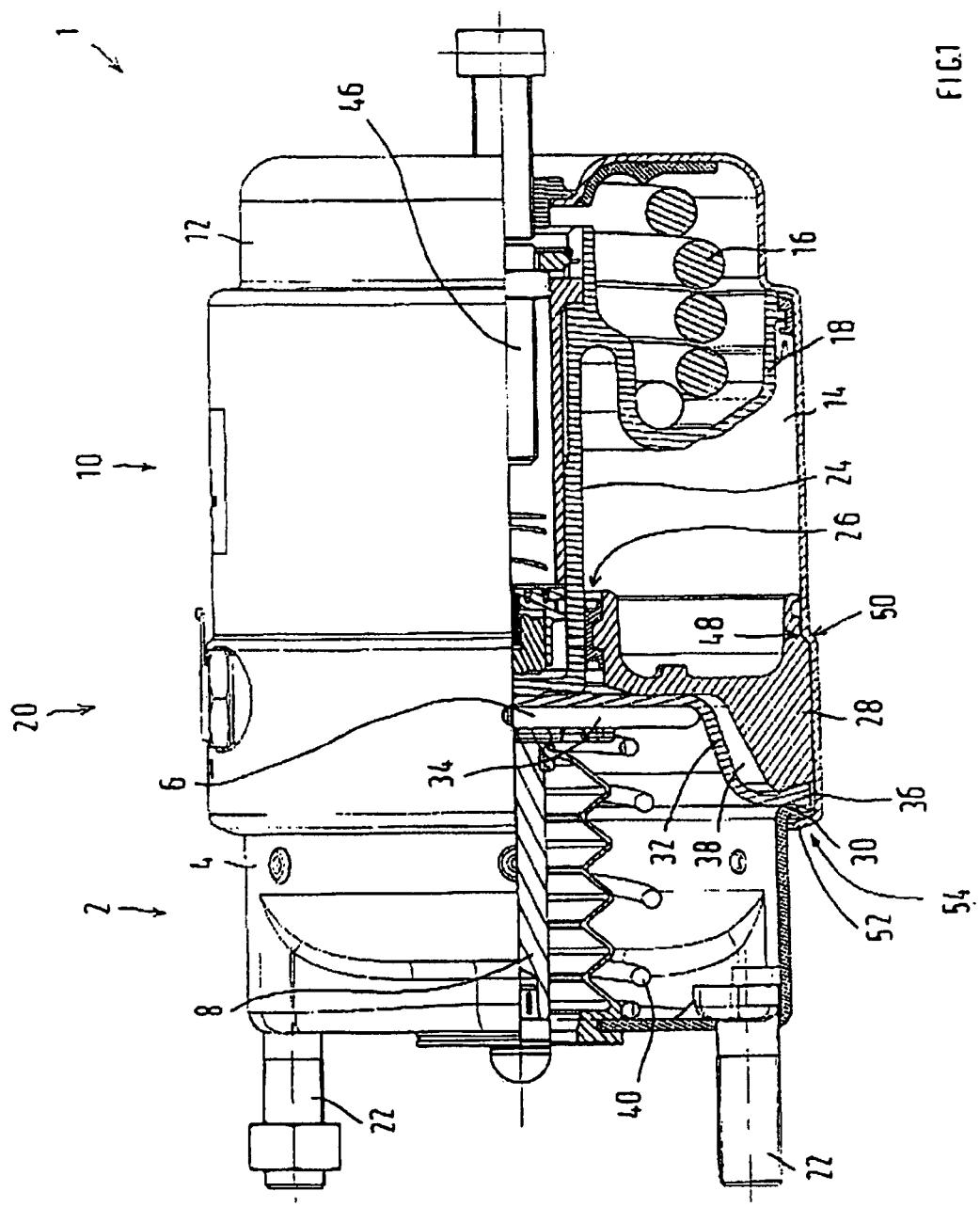
FIG. 1 is a half-sectional illustration of a combined service brake and spring brake device, which has been fabricated in accordance with a preferred embodiment of the method of the invention.

FIG. 1 shows an already completed, combined service brake and spring brake device 1 according to a preferred embodiment of the invention. The latter includes a service brake device 2 with a steel service brake cylinder 4 in which a service brake piston 6, which is acted on pneumatically, is guided and which activates, via a service brake piston rod 8, for example a disk brake (not illustrated for reasons of scale) of a utility vehicle. Furthermore, there is a spring brake device 10 with a steel spring brake cylinder 12 in which a spring brake piston 18, which can be clamped by pneumatic pressure in a spring brake chamber 14 counter to the spring force of a storage spring 16, and by which the service brake piston 6 can be acted upon in the brake-applying direction. The service brake cylinder 4 and the spring brake cylinder 12 form, in their coaxial arrangement one behind the other, a combination brake cylinder 20. Furthermore, steel attachment bolts 22 project away from the service brake cylinder 4 at the head end in order to be able to attach the combination brake cylinder 20 to the vehicle.

A spring brake piston rod 24 of the spring brake piston 18 projects in a seal-forming fashion through an opening 26 in a dividing wall 28 between the spring brake cylinder 12 and the service brake cylinder 4 and can bear with its end face against the service brake piston 6. The latter can contain an axially movable diaphragm 32 which is clamped in at the outer edge between the dividing wall 28 and a radially outer shoulder 30 on the edge of the service brake cylinder 4, as well as a central piston plate 34 which is connected to the diaphragm 32.

The shoulder 30 is bent over preferably through more than 90 degrees so that an oblique contact face with respect to the diaphragm 32 is produced. On the other hand, the dividing wall 28 is also provided at its radially outer edge with an oblique contact face so that a cross section which extends radially outward in wedge shape is produced between them, in which cross section the outer edge 36, which is recessed in a complementary fashion, of the diaphragm 32 is held in a positively locking fashion.

Furthermore, the spring brake piston 18 can be moved in a known fashion into the release position counter to the effect of the storage spring 16 by venting the spring brake chamber 14. Furthermore, by venting a service brake chamber 38, which extends between the dividing wall 28 and the service brake piston 6, it is possible to move the latter into a brake-application position counter to the effect of a return spring 40 which is supported at one end on the service brake piston 6 and at the other end on an end wall of the service brake cylinder 4. Last but not least, a mechanical release device 46 with which emergency release of the spring brake can be carried out if there is a drop in pressure is integrated within the spring brake piston rod 24.

Against this background, the method of functioning of the combined service brake and spring brake device 1 is as follows.

Taking the situation shown in FIG. 1 as a basis, in which both the spring brake and the service brake are released, the service brake chamber 38 is vented in order to apply the service brake, after which, on the one hand, the service brake piston 6 is moved to the left away from the dividing wall 28. The displacement of the service brake piston 6 causes, for example, a disk brake to be applied.

On the other hand, venting the service brake chamber 38 ensures that the service brake piston 6 is moved into the release position, i.e. to the right in FIG. 1, by the return spring 40, and bears against the end face of the spring brake piston rod 24 or the dividing wall 28.

In order to hold the service brake in the brake application position for longer, i.e. if the pneumatic pressure in the service brake chamber 38 has dropped after a certain time or the service brake chamber 38 has been selectively vented, the spring brake should now be applied. For this purpose, the spring brake chamber 14 is vented, after which the storage spring 16 forces the spring brake piston 18, together with the spring brake piston rod 24, to the left in FIG. 1, said spring brake piston rod 24 being in contact at the end with the service brake piston 6. This movement is followed by the service brake piston 6 and the service brake piston rod 8 which is coupled to it and which moves or keeps the disk brake in the applied position.

Within the scope of the method for manufacturing the combination brake cylinder 20 before the service brake cylinder 4 and the spring brake cylinder 12 are equipped with the components and assemblies described above, at least the outward pointing surfaces of the two cylinders 4, 12 and the attachment bolts 22 which are essential for secure attachment of the combination brake cylinder 20 are firstly coated with a corrosion prevention layer comprising zinc or an alloy containing zinc.

The protection of the zinc and of the further metal alloys against corrosion is due to the fact that it is even more stainless than the basic metal steel and therefore functions as a sacrificial anode. As long as the covering zinc layer is present, the basic metal remains protected against corrosion. Other metals can influence the protection of the zinc layer against corrosion. Iron, nickel or cobalt can therefore be selectively used as alloy components for the purpose of improvement. The zinc is itself protected against corrosive attack by the passivation, preferably by chromatization.

Particularly good protection against corrosion is obtained if the corrosion prevention layer has pure zinc, a zinc/iron alloy or an alkaline zinc/nickel alloy and the passivation includes chromatization. In order to meet the EU European guideline 2000/53/CE, solutions containing chromium (VI) (hexavalent chromium) should be avoided.

The service brake cylinder 4 and the spring brake cylinder 12 are then equipped with the components and assemblies described above. For this purpose, for example the dividing wall 28 is pushed into the spring brake cylinder 12 axially from above until it makes contact, with a shoulder 48 which is formed on its radially outer circumferential face, with a complementary shoulder 50 in the outer casing wall of the spring brake cylinder 12, as a result of which an axial stop is formed.

Figure 2:
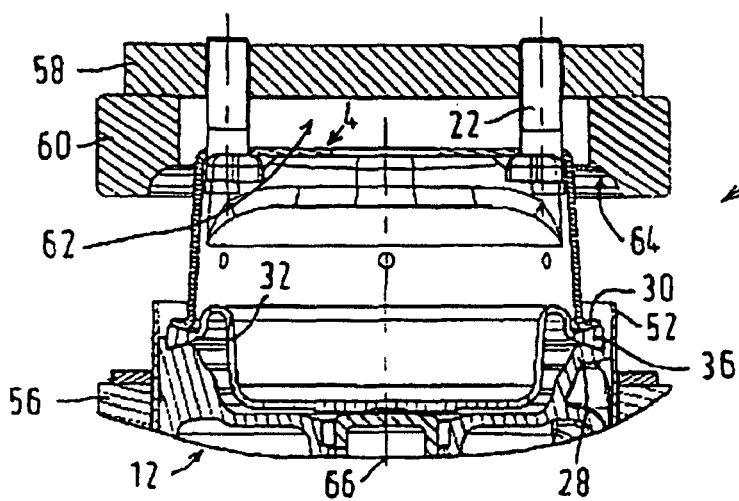
FIG. 2 is a schematic cross-sectional illustration of the combined service brake and spring brake device from FIG. 1 during a fabrication step.
Figure 3:
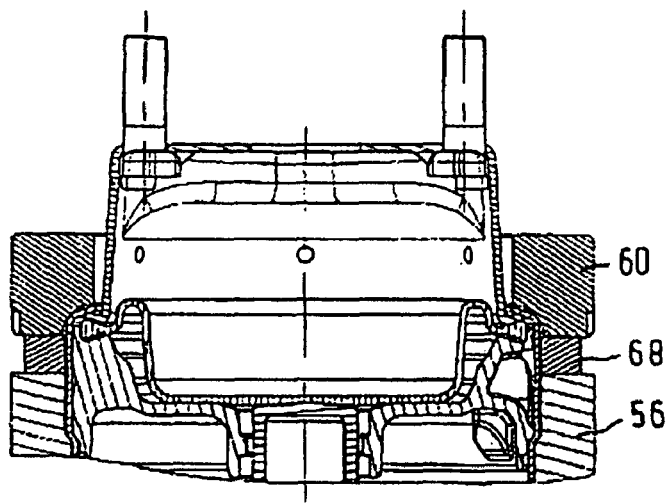
FIG. 3 is a schematic cross-sectional illustration of the combined service brake and spring brake device from FIG. 1 during a further fabrication step.
Figure 4:
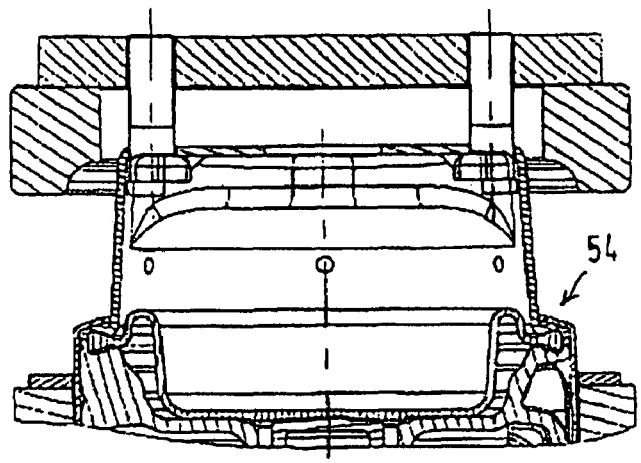
FIG. 4 is a schematic cross-sectional illustration of the combined service brake and spring brake device from FIG. 1 during a still further fabrication step.

Referring to FIGS. 2-4, the connection between the two cylinders 4, 12 is produced by beading 54 by firstly clamping, for example, the spring brake cylinder 12 with its outer casing surface radially into a clamping device 56 and fitting the service brake cylinder 4 onto the spring brake cylinder 12 in such a way that its edges 30, 52 overlap, i.e. on the one hand the straight end edge 52 of the spring brake cylinder 12 radially encloses the edge of the service brake cylinder 4 which is shaped as a radially outer shoulder 30, and on the other hand an axial overlap occurs because the straight edge 52 of the spring brake cylinder 12 projects axially a certain distance beyond the shoulder 30 of the service brake cylinder 4. The service brake cylinder 4 is, on the one hand, secured and centered in this position by, for example, its attachment bolts 22, which are plugged through openings in a fixed head plate 58 as part of the clamping device 56. On the other hand, the edge 36 of the diaphragm 32 of the service brake piston 6 is already positioned between the dividing wall 28 and the shoulder 30. This initial position is illustrated in FIG. 2.

The beading 54 is produced by a relative movement of a die 60 with respect to the service brake and spring brake cylinders 4, 12 which have previously been oriented with respect to one another and which plastically shaped, for example, only the initially still straight edge 52 of the spring brake cylinder 12. For this purpose, the die 60 is preferably embodied as a single-component ring with a central opening 62, which is just large enough that it can enclose the service brake cylinder 4 without collision and can be moved axially along it. Furthermore, the die 60 has at its end face pointing toward the combination brake cylinder 20 a radially inner, preferably rounded recess 64, which can exert pressure against the edge 52 of the spring brake cylinder 12 in order to press it, with plastic deformation, against the shoulder 30 of the service brake cylinder 4 and shape it against the shoulder. For this purpose, the die 60 moves in the axial direction with respect to a central axis 66 of the combination brake cylinder 20. This situation is shown by FIG. 3 in which the die 60 in its end position makes contact, with its end face, with a stopper ring 68 which rests on the opposite end face of the clamping device 56 and whose height depends on the desired degree of deformation and can be adapted on a case by case basis.

In FIG. 4, the die 60 is again disengaged from the combination brake cylinder 20, with the edge 52 of the spring brake cylinder 14 engaging in positively locking fashion over the shoulder 30 of the service brake cylinder 4 and at the same time exerting pressure on the radially outer edge 36 of the diaphragm 32, which is thus likewise secured in a positively locking fashion. Since the shoulders 48, 50 make axial contact with the radially outer circumferential face of the dividing wall 28 and with the outer casing wall of the spring brake cylinder 14 which also absorb the reaction forces, the dividing wall 28 is thus also held in a positively locking fashion in the spring brake cylinder 12. With a single movement of the die 60, four separate components are consequently connected to one another in a positively locking fashion: the service brake cylinder 4, the diaphragm 32, the spring brake cylinder 12 and the dividing wall 28.

In the case of an axial die movement, the die 60 can be constructed as a single component or multiple components. Furthermore, cases in which the housing components have regions which project radially beyond their end edges, and would therefore collide with an annular die guided in the axial direction, are also contemplated. In these cases, the die 60 must be divided at least once in its circumferential extent, with the die arcs then carrying out a radial movement with respect to the central axis 66 of the combination brake cylinder 20. Last but not least, the die 60 could also shape the edge 30 of the service brake cylinder 4 or else both edges 30, 52. Furthermore, the shoulder 30 of the service brake cylinder 4 could be fabricated with the edge 52 of the spring brake cylinder 12 by way of the beading 54 without the intermediate arrangement of a dividing wall 28. The spring brake cylinder 12 could be closed off, for example at its end face pointing to the service brake cylinder, by a wall which is connected to it or embodied integrally with it.

The method described above is not restricted to the manufacture of combination brake cylinders 20. Instead, it can be used to fabricate housings of any assemblies in vehicles, and utility vehicles such as brake cylinders, air dryers or brake boosters.

| Table of Reference Numerals | |
|---|---|
| 1 | Service brake and spring brake device |
| 2 | Service brake device |
| 4 | Service brake cylinder |
| 6 | Service brake piston |
| 8 | Service brake piston rod |
| 10 | Spring brake device |
| 12 | Sprin brake cylinder |
| 14 | Spring brake chamber |
| 16 | Storage spring |
| 18 | Spring brake piston |
| 20 | Combination brake cylinder |
| 22 | Attachment bolt |
| 24 | Spring brake piston rod |
| 26 | Opening |
| 28 | Dividing wall |
| 30 | Shoulder |
| 32 | Diaphragm |
| 34 | Piston plate |
| 36 | Edge |
| 38 | Service brake chamber |
| 40 | Return spring |
| 46 | Release device |
| 48 | Shoulder |
| 50 | Shoulder |
| 52 | Edge |
| 54 | Beading |
| 56 | Clamping device |
| 58 | Head plate |
| 60 | Die |
| 62 | Opening |
| 64 | Recess |
| 66 | Central axis |
| 68 | Stopper ring |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of manufacturing a steel housing, composed of at least two housing components, the method comprising the acts of:
 applying a corrosion prevention layer comprising zinc or a zinc containing alloy to at least one outwardly facing surface of at least one of the at least two housing components with subsequent passivation;
 forming a positively locking overlap of an edge of one housing component that is clamped radially into a clamping device with its outer casing surface over an edge of the other housing component via relative movement of the housing components, which components have previously been oriented with respect to one another and in relation to a die that plastically shapes at least one of the edges of the housing components, and
 before applying the die, clamping one housing component and fitting the other housing component onto the one housing component such that the edges of the housing components overlap,
 wherein before applying the die, the edge of the one housing components is pre-shaped to form a shoulder projecting radially outward.

2. The method according to claim 1, wherein the relative movement occurs in an axial direction with respect to a central axis of the steel housing.

3. The method according to claim 2, wherein the die is a single-component or a multi-component ring, having a recess that exerts pressure against the edge of the one housing component and/or the edge of the other housing component.

4. The method according to claim 1, wherein the relative movement occurs in a radial direction with respect to a central axis of the steel housing.

5. The method according to claim 4, wherein the die is a single-component or a multi-component ring, having a recess that exerts pressure against the edge of the one housing component and/or the edge of the other housing component.

6. The method according to claim 1, wherein the die is a single-component or a multi-component ring, having a recess that exerts pressure against the edge of the one housing component and/or the edge of the other housing component.

7. The method according to claim 1, wherein the steel housing is one of a brake cylinder, an air dryer, or a brake booster of a utility vehicle.

8. The method according to claim 1, wherein the edge of the other housing component is straight with respect to a central axis before application of the die.

9. The method according to claim 1, wherein the corrosion prevention layer is composed of one of: pure zinc, a zinc/iron alloy, or an alkaline zinc/nickel alloy.

10. The method according to claim 9, wherein the passivation includes chromatization.

11. A method of manufacturing a steel housing, composed of at least two housing components, the method comprising the acts of:
 applying a corrosion prevention layer comprising zinc or a zinc containing alloy to at least one outwardly facing surface of at least one of the at least two housing components with subsequent passivation;
 forming a positively locking overlap of an edge of one housing component that is clamped radially into a clamping device with its outer casing surface over an edge of the other housing component via relative movement of the housing components, which components have previously been oriented with respect to one another and in relation to a die that plastically shapes at least one of the edges of the housing components, and
 before applying the die, clamping one housing component and fitting the other housing component onto the one housing component such that the edges of the housing components overlap,
 wherein
  before applying the die, the edge of the one housing components is pre-shaped to form a shoulder projecting radially outward, and
  the edge of the other housing component is straight with respect to a central axis.

12. The method according to claim 11, wherein the passivation includes chromatization.

13. The method according to claim 11, wherein the relative movement occurs in an axial direction with respect to a central axis of the steel housing.

14. The method according to claim 11, wherein the relative movement occurs in a radial direction with respect to a central axis of the steel housing.

15. The method according to claim 11, wherein the die is a single component or a multi-component ring, having a recess that exerts pressure against the edge of the one housing component and/or the edge of the other housing component.

16. The method according to claim 11, wherein the steel housing is one of a brake cylinder, an air dryer, or a brake booster of a utility vehicle.

17. The method according to claim 11, wherein the corrosion prevention layer is composed of: pure zinc, a zinc/iron alloy, or au alkaline zinc/nickel alloy.

* * * * *